July 25, 1961  R. L. MOORE  2,993,976
HEATER CONTROL
Filed Nov. 12, 1958

INVENTOR
ROBERT L. MOORE
Robert T. French
ATTORNEY 2,993,976
HEATER CONTROL
Robert L. Moore, Mansfield, Ohio, assignor to Westinghouse Electric Corporation, East Pittsburgh, Pa., a corporation of Pennsylvania
Filed Nov. 12, 1958, Ser. No. 773,448
8 Claims. (Cl. 219—20)

This invention relates to a control for an electrical resistance heater, more particularly to switching mechanism for terminating flashing of the heater at the end of a controller period, and has for an object to provide an improved thermomotive device for operating the switching mechanism.

Another object of the invention is to increase the thermal mass of a thermomotive device for operating switching mechanism without materially increasing the mechanical stiffness of the device.

A further object of the invention is to facilitate matching the thermomotive means of a cycling wattage control switch for an electric heater to such heater.

The term "flashing" is commonly used in connection with electric heaters to denote a situation in which a heating element is subjected to an abnormally high wattage input that cannot be tolerated for an indefinite period without damaging the heater. Such abnormally high energization may be tolerated for a short controlled period of time to rapidly bring the heater up to approximately the temperature at which it may be operated continuously, and thereafter the heater may be controlled at a lower level of energization to provide continued normal heating.

Where the flashing or high wattage energization period is terminated by a switch in the electrical circuit to the heater and a thermomotive device, for example, a bimetal and a heater therefor, for opening the switch is arranged in series with the main heater, it is important that such thermomotive device be accurately related, or matched, to the heater, so that the thermomotive means will heat and cool at the same rate as the heater. Incorrect matching of the heater and the thermomotive means may result in failure of the switch to open and terminate flashing before the heater has been damaged by overheating, or in its opening too soon and terminating flashing before the heater has reached the desired temperature.

Correct matching of the heater and the thermomotive means is particularly important in situations where the control is so arranged that a user may initiate a flashing cycle for an already hot heater.

Heretofore, various means have been used in an endeavor to obtain the desired matching of the heater and of the thermomotive device. One such means has been the provision of increased mass by adding several thin metal shims to the stack of elements making up the thermomotive device. While this arrangement can provide the necessary mass to effect desired heat retention in the device, it also increases the stiffness of the structure, thereby imposing more load on the main bimetal of the thermomotive device when it seeks to deflect to open the contacts of the switch. It also provides an undesirable increase in the speed at which the thermomotive device returns to switch-closing position upon cooling, due to the force stored in the shims when they are deflected.

In accordance with the present invention, the added heat mass necessary to obtain suitable matching of the heater and the thermomotive device is obtained by adding a heat storage bimetallic strip to the thermomotive device, which strip preferably has deflection characteristics which are the same as those of the main bimetal and is disposed with its high expansion side facing in the same direction as the high-expansion side of the main bimetal. These two bimetals may be disposed at opposite sides of the heater for the thermomotive device, so that both bimetals are heated simultaneously and to substantially the same degree, with the result that, when heated, they deflect uniformly in the same direction and to the same degree. Thus, the heat storage bimetal strip provides the desired additional heat sink without imposing any stiffness or added load on the main bimetal.

While matching of a main heater and its associated thermomotive device is of particular importance in connection with flashing, the desirability for such matching is not limited to such situations, but may be utilized in variable wattage switches for controlling electrical heating loads.

The foregoing and other objects are effected by the invention as will be apparent from the following description and claims taken in connection with the accompanying drawings, forming a part of this application, in which:

Figure 1:
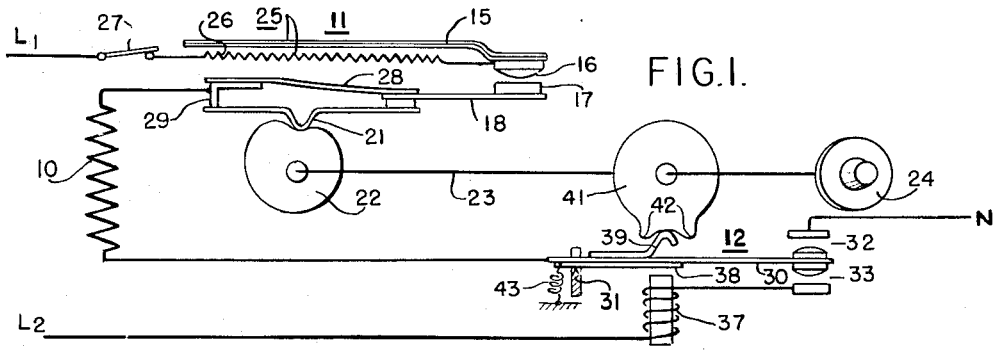
FIG. 1 is a schematic representation of a flasher control constructed in accordance with the present invention.

Referring now to FIG. 1 of the drawing, there is shown schematically apparatus for flashing a surface heater 10 of an electric range or the like, the apparatus including a wattage control 11 and circuit transfer mechanism 12, preferably disposed at opposite sides of the heater 10 and in series therewith in an electrical circuit from line conductor $L_1$ to either line conductor $L_2$ or neutral line conductor N.

The wattage control 11 includes a thermomotive device comprised by a bimetallic arm 15 fixed at one end and carrying at its other end a contact 16, and a heating element 26 disposed in close proximity to the bimetallic arm 15. The contact 16 is adapted to cooperate with a contact 17 carried by an arm 18 which is mounted on an arm 19 having a cam follower 21 adapted to be moved by a cam 22. The cam 22 is carried on a shaft 23, the latter being manually adjustable by a control or selector knob 24. Rotation of the knob 24 produces corresponding rotation of cam 22, which is so designed as to adjust the position of the contact 17 carried by the arms 18 and 19, to vary the percentage of closed time of the contacts 16 and 17, thereby adjusting the wattage input to the main heater 10.

The heating element 26 of the thermomotive device forms a portion of the circuit from line conductor $L_1$ to the heater 10, with the result that any time the latter heater is energized the heating element 26 is likewise energized to heat the bimetallic arm 15. This arm is disposed with its high expansion side toward the arm 18 and contact 17, with the result that heating of this bimetallic arm tends to move the contact 16 away from the cooperating contact 17 to open the circuit. Thus the bimetallic arm 15 and its associated heating element 26 constitute the thermomotive device 25 for actuating contact 16 relative to contact 17. As is customary in such control devices, a line switch 27 may be provided between the line conductor $L_1$ and the heating element 26. The circuit from $L_1$ to the heater includes not only the line switch 27 and heating element 26, but also the contacts 16 and 17, the arm 18 and a flexible arm 28 and its fixed support 29.

The circuit transfer mechanism 12, disposed between the heater 10 and the other conductor $L_2$ or N of a power source, includes an arm 30 pivotally supported near one end, as at 31, and electrically connected at that end to the heater 10. The arm 30 carries at its opposite end a pair of contacts adapted to cooperate with a pair of fixed contacts providing switches 32 and 33, the switch 32 being connected electrically to the neutral line conductor N and the switch 33 being connected, through an electromagnetic device 37, with the line conductor L₂.

An armature 38 is carried by the arm 30 in alignment with the core of the electromagnetic device 37 and is so spaced therefrom relative to the spacing of the contacts of switch 33 that when the arm is moved to a position establishing an electrical circuit through the electromagnetic device 37, the latter will hold the armature 38 thereagainst and retain the switch 33 closed.

The arm 30 also carries a cam or follower 39 adapted to be engaged by a cam 41 carried on the shaft 23, which is manually adjustable by the knob 24, previously mentioned.

In the cam position shown in FIG. 1, the control is in the "off" setting and the cam 41 positions the arm 30 and its contacts midway between the stationary contacts and out of engagement with both of the latter, thereby opening both the neutral circuit and the L₂ circuit. In this setting the cam 22 also is so disposed as to position the contact 17 out of engagement with the contact 16, thereby opening the circuit at the L₁ side of the heater 10. Upon rotation of the shaft 23 to any setting other than "off," the high points 42 on the cam 41 will move the arm 30 downwardly, as viewed in FIG. 1, to close switch 33. At the same time cam 22 will move arms 19 and 18 upwardly to close contacts 16 and 17, thereby establishing a 230 volt circuit from line conductor L₁ through the heating element 26, contacts 16 and 17, arms 18 and 28, support 29, heater 10, arm 30, switch 33 and electromagnetic device 37 to L₂. This high voltage will flash the heater 10 to quickly bring it to the operating temperature called for by the setting of the knob 24.

When the heater 10 has reached the desired temperature by flashing, the heating element 26 will have imparted sufficient heat to the bimetallic arm 15 to produce the deflection of the latter required to separate contacts 16 and 17, thereby opening the 230 volt circuit, assuming that the heating element 26 and its associated bimetal 15 are properly matched to the heater 10. Opening of this circuit deenergizes the electromagnetic device 37, thereby permitting a tension spring 43 to bias the arm 30 to a position where the switch 32 is closed, thus establishing a circuit from the heater 10 to the neutral line conductor N, for subsequent normal energization of the heater. Thereafter, and until the setting of the control knob 24 is returned to "off" position, energization of the main heater 10 will be under control of the wattage control 11.

The structure and operation so far described may be considered typical of flashing controls presently in use, the present invention relating to an improved means for matching the thermomotive device 25 with the main heater 10.

Figure 2:
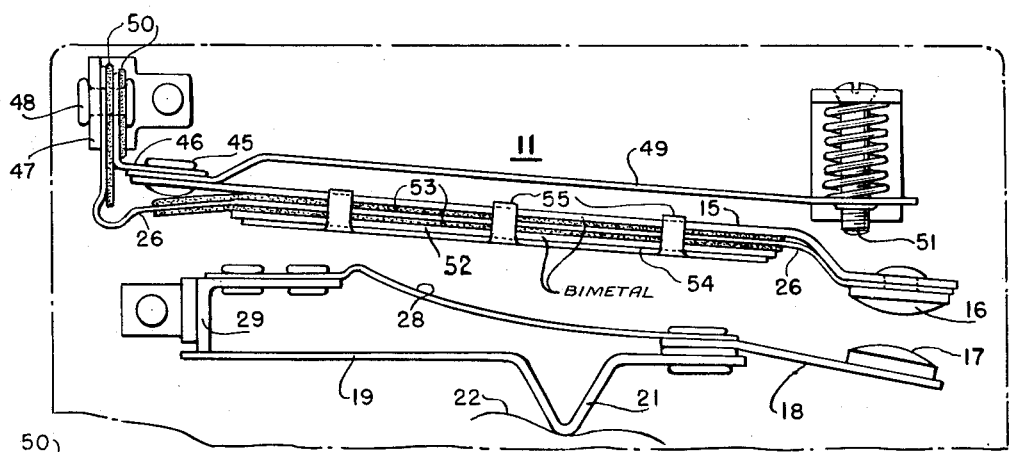
FIG. 2 is an elevational view of a portion of the control shown schematically in FIG. 1, incorporating a commercial embodiment of the invention.
Figure 3:
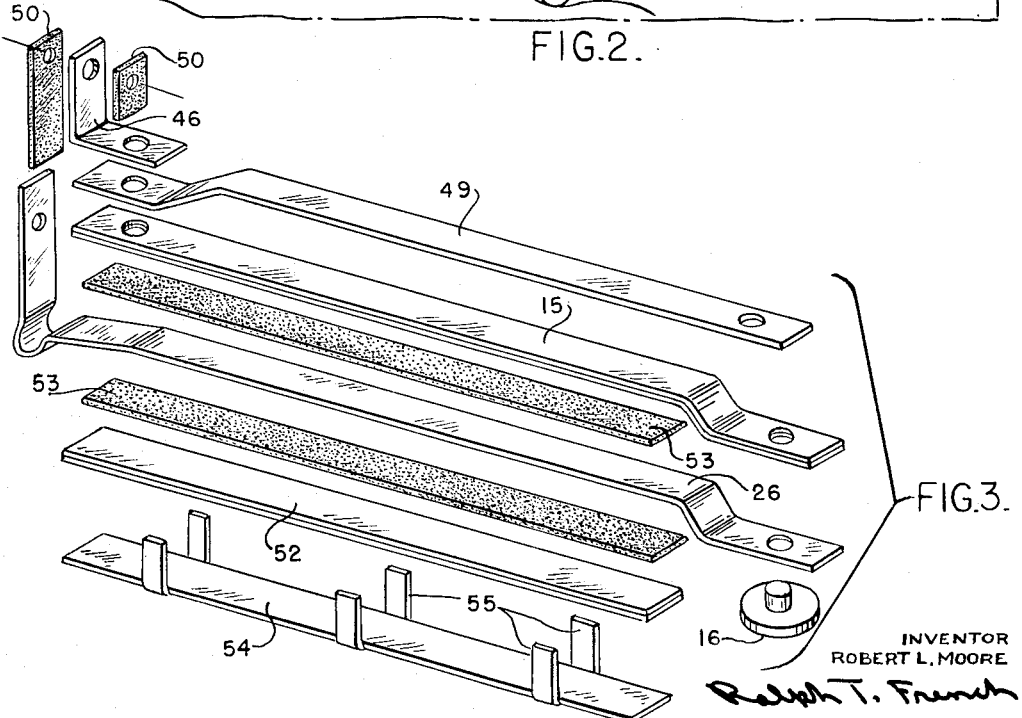
FIG. 3 is an exploded perspective view of a portion of the structure shown in FIG. 2.

One construction utilizing the present invention is illustrated in FIGS. 2 and 3 wherein the bimetallic arm 15 is shown secured, as at 45, to a hinge member 46 which in turn is secured to a fixed support 47 by suitable means 48. Insulation 50 electrically insulates the hinge 46 from its support 47. The securing means at 45 may also connect, to the adjacent end of the bimetallic arm 15, an adjusting arm 49 threadedly receiving at its free end an adjusting screw 51 by which factory or service adjustments of the bimetallic arm 15 may be made.

To provide sufficient mass or heat storage for the thermomotive device, a bimetallic strip 52 is positioned parallel to the bimetallic arm 15. The heater 26 shown schematically in FIG. 1 is illustrated in FIGS. 2 and 3 as a flat strip and preferably is positioned between the main bimetal 15 and the bimetallic strip or heat storage bimetal 52. Suitable electrical insulating material 53 of strip form is disposed between the heater 26 and the two bimetals 15 and 52, these two strips of insulating material preferably being of the same material and thickness so that the heat flow from the heater 26 to the two bimetals will be substantially equal with the result that, since preferably the two bimetals have the same deflection characteristics, and have their high expansion sides facing in the same direction, they will deform equally and uniformly. Consequently, the heat storage bimetal 52 not only imposes no stiffening on the assembly but actually helps the main bimetal to deflect the complete thermomotive device 25.

Suitable means are provided for holding the above-described elements together and in the present construction this means is a thin sheet of brass stock 54 having a plurality of fingers 55 extending therefrom along opposite edges of the stack of elements with their terminal portions bent over the upper side of the main bimetallic member, as viewed in FIG. 2, thereby retaining the two bimetals, the heating element and the electrical insulating material in stacked assembled relationship.

While the invention has been shown in but one form, it will be obvious to those skilled in the art that it is not so limited, but is susceptible of various other changes and modifications without departing from the spirit thereof.

What is claimed is:

1. In switching mechanism including a pair of cooperating contacts, thermomotive means adapted to actuate said mechanism comprising: a main bimetal carrying one contact of said pair of contacts, a heat storage bimetal, said main bimetal and heat storage bimetal having their high and low expansion sides oriented the same with respect to one another so as to produce deflection in the same direction upon heating thereof; insulating means between said bimetals; means for heating said bimetals; and means securing said bimetals and said insulating means in assembled relation.

2. In switching mechanism including a pair of cooperating contact, thermomotive means adapted to actuate said mechanism comprising: a main bimetal carrying one contact of said pair of contacts; a heat storage bimetal; a heater associated with said bimetals; insulating means disposed between said heater and said bimetals, said main bimetal and heat storage bimetal having their high and low expansion sides oriented the same with respect to one another so as to produce deflection in the same direction upon heating thereof; and means securing said bimetals, said heater and said insulating means in stacked relation.

3. In switching mechanism including a pair of cooperating contacts, a thermally responsive device adapted to actuate said mechanism, said device comprising: a main bimetal hingedly mounted adjacent one end and carrying one contact of said pair of contacts adjacent its other end, a heat storage bimetal disposed parallel to said main bimetal but spaced therefrom, a heater element in the space between said bimetals, means electrically insulating said heater element from said bimetals throughout at least a major portion of the lengths of the latter, said main bimetal and heat storage bimetal having their high and low expansion sides oriented the same with respect to one another so as to produce deflection in the same direction upon heating thereof, and means securing the heater element, the heat storage bimetal and the insulating means in assembled relation to the main bimetal.

4. Switching mechanism comprising a pair of cooperating contacts, a pair of spaced resilient arms each carrying one of said contacts, one of said resilient arms being bimetallic, a bimetallic strip adapted to cooperate with said bimetallic arm, said bimetallic arm and bimetallic strip having their high and low expansion sides oriented the same with respect to one another so as to produce deflection in the same direction upon heating thereof, a heating element disposed between said bimetallic arm and said bimetallic strip, and strap means for clamping said bimetallic arm, said heating element and said bimetallic strip in stacked relation, said bimetallic strip being free at both ends.

5. Switching mechanism comprising a pair of cooperating contacts, a pair of spaced arms each carrying one of said contacts, one of said arms being bimetallic, a bimetallic strip, said bimetallic arm and bimetallic strip having their high and low expansion sides oriented the same with respect to one another so as to produce deflection in the same direction upon heating thereof, a heating element associated with said bimetallic arm and said bimetallic strip, electrical insulating means disposed between said heater and said bimetallic arm and strip, and means clamping said bimetallic arm, said heating element, said bimetallic strip and said insulating means together in stacked relation.

6. In a flasher control for an electrical heating unit; means establishing an electrical circuit for energizing said heating unit and including switching mechanism having a pair of cooperating contacts, supporting means for one of said contacts, a bimetallic arm carrying the other of said contacts, a bimetallic strip disposed in parallel spaced relation to said bimetallic arm, a heater element in said circuit disposed in the space between said bimetallic arm and said bimetallic strip for heating said arm and said strip when said heating unit is energized, and means securing said bimetallic arm, said heater element and said bimetallic strip in assembled relation, said bimetallic arm and said bimetallic strip having their high-expansion sides facing in the same direction.

7. In a flasher control for an electrical heating unit, an electrical circuit for energizing said heating unit, switching means for said circuit including a pair of cooperating contacts, a support for one of said contacts, a bimetal arm carrying the other of said contacts, a bimetal strip disposed in parallel spaced relation to said bimetal arm, a heater element in said circuit and positioned in the space between said bimetal arm and said bimetal strip for heating said arm and said strip when said heating unit is energized, electrical insulation between said heating element and said bimetal arm and strip, and means for retaining said bimetal arm, said heating element, said bimetal strip and said electrical insulation assembled in stacked relation, said bimetal arm and strip having their high-expansion sides facing in the same direction whereby deflection of said bimetal strip when heated aids the bimetal arm in moving the contact carried thereby.

8. In a flasher control for an electrical heating unit, electrical circuitry for selectively connecting said heating unit with a high voltage source for flashing operation and with a low voltage source for normal operation, and means in said circuitry for switching between said high voltage source and said low voltage source, said switching means including a pair of cooperating contacts, a support for one of said contacts, a bimetal arm carrying the other of said contacts, a bimetal strip disposed in parallel spaced relation to said bimetal arm, a heater element in said circuit and positioned in the space between said bimetal arm and said bimetal strip for heating said arm and said strip when said heating unit is energized, electrical insulation between said heating element and said bimetal arm and strip, and means for retaining said bimetal arm, said heating element, said bimetal strip and said electrical insulation assembled in stacked relation, said bimetal arm and strip having their high-expansion sides facing in the same direction whereby deflection of said bimetal strip when heated aids the bimetal arm in moving the contact carried thereby.

References Cited in the file of this patent

UNITED STATES PATENTS

| 1,684,281 | Kelly | Sept. 11, 1928 |
| 2,526,924 | Andrews | Oct. 24, 1950 |
| 2,623,137 | Vogelsberg | Dec. 23, 1952 |
| 2,678,379 | Fry | May 11, 1954 |
| 2,687,468 | Munschak | Aug. 24, 1954 |
| 2,728,842 | Turner | Dec. 27, 1955 |

FOREIGN PATENTS

| 427,512 | Great Britain | Apr. 25, 1935 |